United States Patent [19]
Boor, Jr. et al.
[11] 4,151,397
[45] Apr. 24, 1979

[54] SELF-ALIGNING THERMAL PRINT HEAD

[75] Inventors: Robert L. Boor, Jr., St. Petersburg; Robert A. Keller, Seminole; Donald E. Kesinger, Largo, all of Fla.

[73] Assignee: E-Systems, Inc., Dallas, Tex.

[21] Appl. No.: 824,212

[22] Filed: Aug. 12, 1977

[51] Int. Cl.[2] ........................ G01D 15/10; B41J 11/20
[52] U.S. Cl. .................................. 219/216; 346/76 R; 400/120
[58] Field of Search ...................... 197/1 R; 346/76 R; 219/216

[56] References Cited

U.S. PATENT DOCUMENTS

| | | | |
|---|---|---|---|
| 3,313,913 | 4/1967 | Limberger | 219/216 |
| 3,575,580 | 4/1971 | Anderson | 219/216 |
| 3,719,261 | 3/1973 | Heinzer et al. | 197/1 R |
| 3,757,350 | 9/1973 | Fliegner et al. | 346/76 R |
| 3,904,010 | 9/1975 | Krauss et al. | 197/1 R |
| 3,986,594 | 10/1976 | Kondur | 400/322 |
| 4,029,193 | 6/1977 | Kwan | 197/1 R |

FOREIGN PATENT DOCUMENTS

| | | | |
|---|---|---|---|
| 2406613 | 8/1974 | Fed. Rep. of Germany | 197/1 R |
| 2318947 | 10/1974 | Fed. Rep. of Germany | 197/1 R |
| 2365504 | 4/1975 | Fed. Rep. of Germany | 197/1 R |

*Primary Examiner*—Clyde I. Coughenour
*Attorney, Agent, or Firm*—Robert V. Wilder

[57] ABSTRACT

A thermal print head assembly for use in high speed printers of the dot matrix type wherein the thermal print element is forced against the printing paper and platen by means of bias springs. The thermal print head comprises a dot-generating thermal wafer which is rigidly mounted in a member supported by a frame and spring biased against the platen. The thermal print head as described may also include a biasing heater element and a plurality of thermal print heads combined together to form a thermal line printer.

9 Claims, 3 Drawing Figures

SELF-ALIGNING THERMAL PRINT HEAD

BACKGROUND OF THE INVENTION

The present invention relates to thermal printers and more particularly to an improved thermal print head which maintains a uniform pressure against the print medium.

A printing wafer which contains a series of in-line dot thermal print elements as used in the present invention is described in U.S. Pat. Nos. 3,774,899 and 3,808,669. This wafer contains a plurality of elements each of which is heated when energized by an electrical signal. The heated element causes the formation of a dot upon a thermal sensitive paper which is in contact with the heating element. The intensity and clarity of the dot produced depends upon the proximity of the heating element to the paper and the tension exerted on the element against the thermal sensitive paper. The paper is supported by either a round or flat platen.

In previous high speed thermal printers the print element wafers are aligned on a printer frame in a given position in relation to the platen and are then rigidly fixed in place. This structure, however, is subject to a number of problems which can cause the intensity of the dot to vary and thereby adversely affect the clarity of the characters printed on the thermal sensitive paper. The letter quality will be degraded when either the proximity of the element to the paper or the tension of the element against the paper changes from some optimum setting. These conditions are present when the surface of the platen is irregular, the platen has a tapered shape or the sizes of the printer components vary due to thermal expansion or contraction.

SUMMARY OF THE INVENTION

In accordance with the present invention, a thermographic printing unit includes a frame, a platen and thermal print head. The thermal print head includes a dot-generating thermal element and a member rigidly holding the thermal element. The member is supported by the frame and movable relative to the platen. A spring biases the member in relation to the platen.

The print head includes a printing element that floats against the printing medium with a constant pressure thereby providing automatic and continuous alignment of the thermal element with the printing medium and eliminates the problems of spatial variations. This maintains the intensity and clarity of the printed characters, makes possible increased printer speed and provides a simple method for adjusting the thermal element wafer pressure.

BRIEF DESCRIPTION OF THE DRAWINGS

For a more complete understanding of the present invention and the advantages thereof, reference is now made to the following description taken in conjunction with the following drawings.

DETAILED DESCRIPTION OF THE INVENTION

Figure 1:
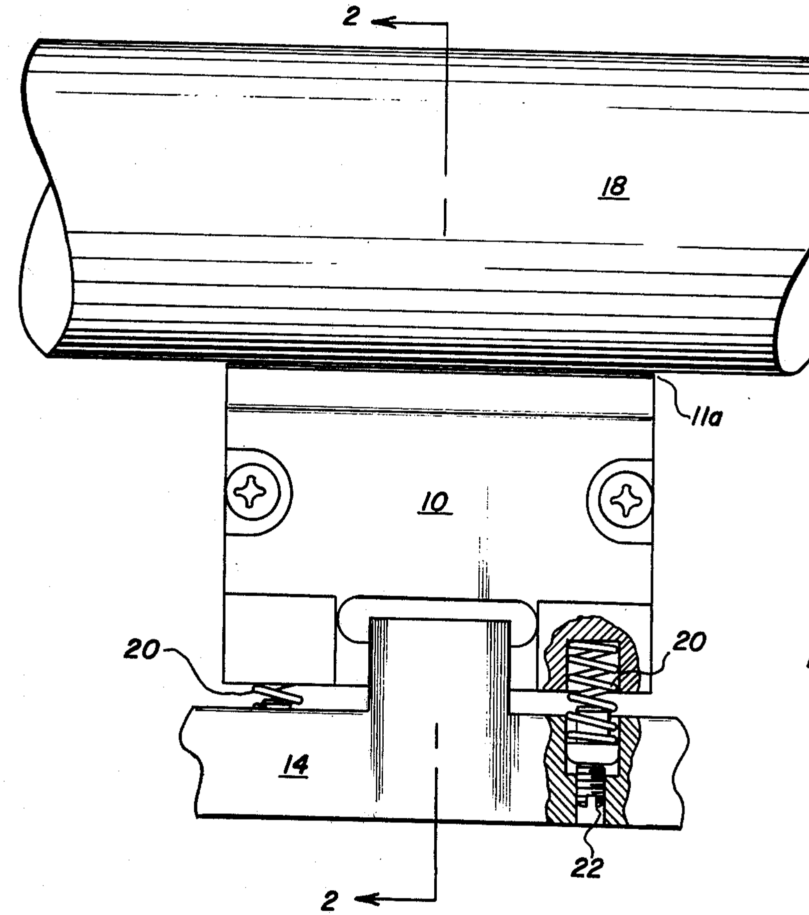
FIG. 1 is a plan view of the self-aligning thermal print head of the present invention.
Figure 2:
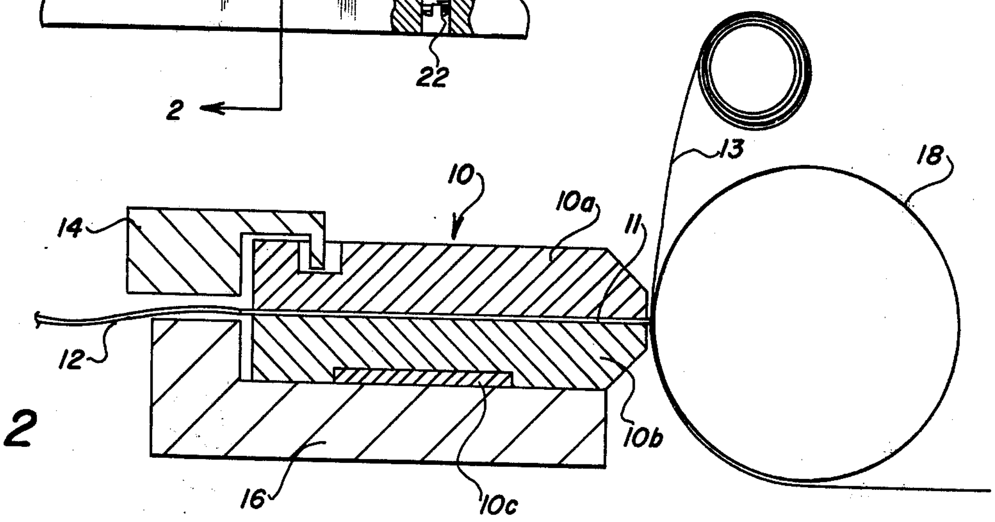
FIG. 2 is a section view of the present invention taken along line 2—2 of FIG. 1.

A thermal print head embodying the present invention is shown in FIGS. 1 and 2 and includes a printer head module 10 having an upper member **10*a*, a lower member 10*b*, and a module heater strip 10*c*. A thermal print element wafer 11 is clamped between the module members 10*a* and 10*b* and includes a set of parallel dot-printing elements 11*a*. The module heater strip 10*c* provides heat to the module 10 and to the thermal print element wafer 11** to maintain these units at a fixed predetermined temperature.

Each of the print elements **11*a* is connected to an individual conductor included within the electrical cable 12** thereby enabling the activation of any individual element or combination thereof.

Thermal sensitive paper 13 is carried by a platen 18 in a conventional manner past the thermal element wafer 11 whereby the print element wafer 11 can be activated by an electrical signal to form a dot upon the thermal sensitive paper. The print elements **11*a* have very low thermal time constants to enable the formation of a dot in a very short time period. The dots must be printed in a proper sequence in relation to the moving thermal sensitive paper to form a matrix representing a particular character. The most common layout is a $5\times7$ matrix wherein, for example, the number 1 would be formed by a single print element 11*a* generating seven vertically stacked dots on the thermal sensitive paper 13**.

The module 10 is supported by a frame 16 and the horizontal movement of the module 10 is limited by a module retainer 14. Compression springs 20 are positioned between the fixed module retainer 14 and the movable module 10 so as to force the thermal print element wafer 11 into contact with the thermal sensitive paper 13. The magnitude of the force applied by the compression springs 20 is adjusted by tension adjustment screws 22.

The quality of the dot produced by a print element **11*a* and therefore the quality of the resulting character is a function of the intensity of the dot burn on the thermal sensitive paper. The quality of the burn is in turn determined by the spaced relationship of the print element 11*a* to the thermal sensitive paper 13. Under the optimum conditions, the module 10 forces the print element 11*a* against the thermal sensitive paper with a constant force at all times. But when the thermal wafer element 11 is fixed in place on the frame, as in the prior art, the spaced relationship of the wafer to the paper can vary due to irregularities in the surface of the platen 18** and to the thermal expansion and contraction of the various elements of the printer.

The compression springs 20 bias the module 10 to compensate for the above condition by allowing the module 10 to move horizontally on the frame 16 wherein the print elements **11*a* are in effect floating on the thermal sensitive paper 13 supported by the platen 18. Therefore, when surface irregularities appear on the platen 18 as it rotates, the module 10 slides forward or backward on the frame 16** to accommodate the irregularities. Variations in the size of structural components due to thermal expansion and contraction are similarly accommodated.

Since the print elements **11*a*** maintain a uniform pressure over a period of time against the paper, wear on the elements is reduced and the lifetime of the print head is extended. This uniformity in addition makes possible operation of the printer at a much higher speed.

Figure 3:
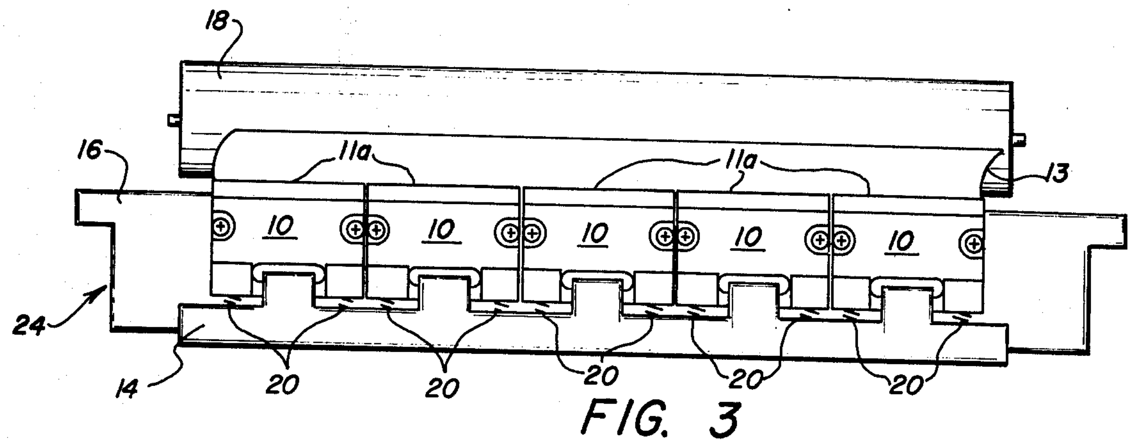
FIG. 3 is a plan view of a thermal line printer utilizing the present invention.

FIG. 3 shows the arrangement of a number of modules 10 to form a full page width thermal line printer 24. The compression springs 20 force the modules 10 against the paper 13. The modules 10 are supported by the frame 16 and are limited in their movement by the module retainer 14. In a conventional system, each wafer 11 has 80 dot print elements 11a to accommodate the printing of a 16 character field using a 5×7 matrix. With a total of five modules, the printer 24 can print out a standard 80 character line. The modules 10 are independently tensioned against the paper 13 and the platen 18 thereby accommodating any nonuniformity in the shape of the platen 18 and any changes in component sizes due to thermal expansion or contraction.

Although only one embodiment of the invention has been illustrated in the accompanying drawings and described in the foregoing detailed description, it will be understood that the invention is not limited to the embodiment disclosed, but is capable of numerous rearrangements, modifications, and substitutions without departing from the scope of the invention.

What is claimed is:

1. A thermal print head in a thermographic printing unit having a frame and a platen for printing on a movable sheet of thermal sensitive material when disposed adjacent the platen, said print head comprising:

(a) a dot-generating thermal element for floating engagement with the movable sheet of thermal sensitive material when disposed adjacent the platen to selectively generate dots on the sheet;

(b) a print head module rigidly holding said thermal element;

(c) a planar surface on the printing unit frame for slideably supporting the print head module for sliding movement towards and away from the platen;

(d) spring means engaging the print head module at a plurality of positions for biasing said print head module towards the platen;

(e) a cavity in said print head module disposed distally from said planar surface having first and second spaced apart opposing surfaces normal to the direction of the sliding movement of said print head module; and (f) a module retainer for selectively engaging said first and second surfaces to limit the sliding movement of said print head module.

2. A thermal print head as recited in claim 1 wherein said print head module includes a heating element for heating said module.

3. A thermal print head as recited in claim 1 including means for adjusting the bias produced by said spring means.

4. In a thermographic printing unit having a frame and platen, a thermal line printer for printing on a movable sheet of thermal sensitive material when disposed adjacent the platen, said line printer comprising:

a plurality of thermal print heads each including:

(a) a dot-generating thermal element for floating engagement with the movable sheet of thermal sensitive material when disposed adjacent the platen to selectively generate dots on the sheet;

(b) a print head module rigidly holding said thermal element;

(c) a planar surface on the printing unit frame for slideably supporting the print head module for sliding movement towards and away from the platen; and (d) a plurality of springs engaging each print head module at positions spaced apart along a line generally perpendicular to the direction in which the sheet is movable for biasing said print head module towards the platen;

(e) limit means between said springs for limiting the motion of the print head module towards and away from said platen and for allowing pivotal motion of said print head in the plane of said planar surface.

5. A thermal line printer as recited in claim 4 wherein said print head module includes a heating element for heating said module.

6. A thermal line printer as recited in claim 4 including means for adjusting the tension of said springs.

7. A thermal line printer as recited in claim 4 including means to limit the travel of said print head module relative to the said platen.

8. A thermal line printer in a thermographic printing unit having a frame and a platen for printing on a movable sheet of material when positioned between the line printer and the platen, comprising:

(a) a plurality of print head modules slideably mounted on the frame, each of said print head modules being mounted for independent sliding motion towards and away from the platen;

(b) each print head module including first and second stop surfaces oriented normal to the direction of the sliding motion;

(c) a modular retainer for selectively engaging the first and second stop surfaces to limit the sliding movement of each of said print head modules;

(d) a plurality of springs mounted on the frame and engaging said print head modules for biasing said print head modules toward the platen, each of said print head modules being biased by at least two springs which engage said print head module at two or more positions;

(e) a plurality of thermal elements, one of said thermal elements being mounted in each of said print head modules for engagement with the movable sheet of material when the sheet is positioned between the line printer and the platen; whereby each print head module is biased by at least two springs to urge said thermal elements against a sheet of material in a floating relationship; and (f) means for independently adjusting the spring force of each spring against said print head module.

9. In a thermographic printing unit having a frame and a platen for printing on a moveable sheet of material when positioned adjacent the platen, an improvement comprising:

(a) a print head module slideably mounted on the frame for independent sliding motion towards and away from the platen;

(b) a plurality of springs mounted on the frame for engaging said print head module at spaced apart positions for biasing said print head module towards the platen;

(c) said print head module including first and second stop surfaces oriented normal to the direction of the sliding motion;

(d) a modular retainer mounted between said springs for selectively engaging the first and second stop surfaces to limit the sliding motion of said print head module and for allowing pivotal motion of said print head module in a plane; and (e) a thermal element mounted in said print head module for engagement with the moveable sheet of material in a floating relationship when the sheet is positioned adjacent the platen.

* * * * *